United States Patent
Schwartz

(10) Patent No.: US 8,199,724 B2
(45) Date of Patent: Jun. 12, 2012

(54) MULTIPLE BEAM ANTENNA BASE STATION

(75) Inventor: David J. Schwartz, Tualatin, OR (US)

(73) Assignee: XR Communications, LLC, New York, NY (US)

( * ) Notice: Subject to any disclaimer, the term of this patent is extended or adjusted under 35 U.S.C. 154(b) by 732 days.

(21) Appl. No.: 11/526,543

(22) Filed: Sep. 25, 2006

(65) Prior Publication Data

US 2007/0070957 A1    Mar. 29, 2007

Related U.S. Application Data

(60) Provisional application No. 60/719,856, filed on Sep. 23, 2005.

(51) Int. Cl.
- *H04M 1/00* (2006.01)
- *H04B 1/38* (2006.01)
- *H04B 7/00* (2006.01)
- *H04B 7/216* (2006.01)
- *H04W 36/00* (2009.01)
- *H04W 4/00* (2009.01)

(52) U.S. Cl. ........ 370/334; 370/335; 370/328; 370/338; 455/561; 455/562.1; 455/507; 455/560; 455/575.7; 455/436

(58) Field of Classification Search .................. 455/524, 455/560, 428, 101, 502, 575.7, 121, 561, 455/562.1, 450, 436, 442, 434, 440, 507; 370/339, 334, 328, 331, 335, 338
See application file for complete search history.

(56) References Cited

U.S. PATENT DOCUMENTS

| | | | | |
|---|---|---|---|---|
| 5,615,409 | A | * | 3/1997 | Forssen et al. ................. 455/440 |
| 5,966,094 | A | * | 10/1999 | Ward et al. ..................... 342/373 |
| 6,081,714 | A | * | 6/2000 | Wakizaka ...................... 455/437 |
| 6,141,566 | A | * | 10/2000 | Gerdisch et al. ........... 455/562.1 |
| 6,597,927 | B1 | * | 7/2003 | Eswara et al. ............. 455/562.1 |
| 6,801,789 | B1 | | 10/2004 | Kato |
| 7,075,485 | B2 | | 7/2006 | Song et al. |
| 7,187,949 | B2 | * | 3/2007 | Chang et al. ............... 455/562.1 |
| 2002/0193146 | A1 | * | 12/2002 | Wallace et al. ............... 455/562 |
| 2005/0281220 | A1 | * | 12/2005 | Stanwood et al. ............ 370/328 |
| 2006/0171357 | A1 | * | 8/2006 | King et al. ..................... 370/331 |

* cited by examiner

*Primary Examiner* — Wesley Kim
(74) *Attorney, Agent, or Firm* — Mintz, Levin, Cohn, Ferris, Glovsky and Popeo, P.C.

(57) ABSTRACT

Systems, devices and method are provided in association with a multiple beam antenna base station. One system embodiment includes a multiple beam antenna base station configured to communicate data to a number of subscriber stations using a number of multiple antenna beams. The multiple beam antenna base station is implemented with an independent receiver for each of the number of multiple antenna beams. In various embodiments, each of the independent receivers of the multiple beam antenna base station is configured to determine signal quality of a preamble of an uplink transmission from a subscriber station via the number of multiple antenna beams.

3 Claims, 8 Drawing Sheets

MULTIPLE BEAM ANTENNA BASE STATION

CROSS-REFERENCE TO RELATED APPLICATIONS

This application claims the benefit of U.S. Provisional Application No. 60/719,856, filed Sep. 23, 2005, the entire content of which is incorporated herein by reference.

BACKGROUND

Utilizing an antenna with gain improves various aspects of a communications system's performance. Previous applications have utilized a single, high gain antenna in conjunction with a single base station in a system implementing the IEEE 802.16 standard. This configuration provides improved performance in the direction of the antenna's beam, but at the expense of the base station's coverage angle. With this type of system, multiple base stations would be required in order to cover a large angle of view while also providing high gain for improved performance.

IEEE 802.16 is a group of broadband wireless communications standards for metropolitan area networks (MANs), and is also referred to as the WirelessMAN™ specification. IEEE 802.16 specifies a wireless networking technology that provides for fixed point-to-multipoint broadband wireless systems that operate in the ten to sixty-six (10-66) GHz licensed spectrum, and provides for non-line-of-sight extensions in the two to eleven (2-11) GHz spectrum which delivers a shared data rate up to seventy (70) Mbps over distances up to approximately thirty (30) miles. Also referred to as the WiMAX standard (Worldwide Interoperability for Microwave Access), a networked 802.16 system can provide high-speed broadband Internet access over long range wireless connections. Additionally, a WiMAX connection can also be coupled to a standard wired or wireless Local Area Network (LAN).

BRIEF DESCRIPTION OF THE DRAWINGS

The same numbers are used throughout the drawings to reference like features and components.

DETAILED DESCRIPTION

Figure 1:
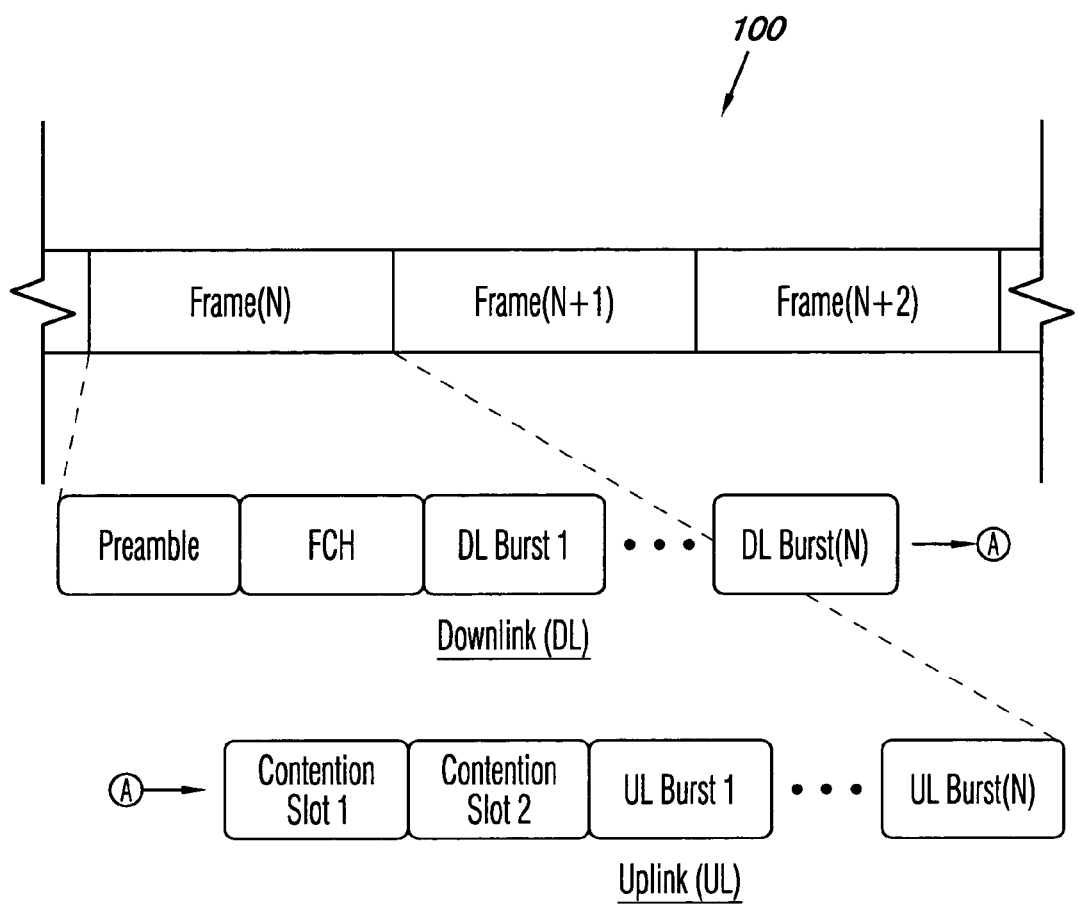
FIG. 1 illustrates a WirelessMAN-OFDM physical layer frame structure in an embodiment of multiple beam antenna base station.

Multiple beam antenna base station provides a single base station that utilizes multiple antenna beams which is transparent to subscriber stations. The system provides both high gain for improved performance in the direction of an antenna beam while maintaining coverage over a large angle of view. The base station is fully compliant with the IEEE 802.16 standard, and there are no special capabilities required of the subscriber stations for the overall system to benefit from the use of the multiple beam antenna.

The IEEE 802.16 standard requires that certain transmissions within each frame be sent simultaneously in all directions covered by the base station. These transmissions are the downlink preamble and frame control header (FCH) bursts, as well as any broadcast messages. Messages intended for a single subscriber station need only be sent in the direction of that subscriber station. Additionally, the base station receives transmissions from one subscriber station at a time.

To direct a transmission to, or a reception from, a given subscriber station, the base station determines which of the available beams is aimed at, or covers, the particular subscriber station. The multiple beam antenna base station is implemented with independent receivers on each beam that can measure the signal quality of the preambles of uplink transmissions. The signal quality reports from each of the receivers are used to select the communication path that has the best determined performance. The best communication path is then used to receive the remainder of an uplink burst.

When the base station needs to transmit to a given subscriber station, it uses the last known best communication path that was determined by reception. Because the base station does not transmit a directed frame to a subscriber station until the subscriber station has requested and been granted access to the system, the base station will always have a last known best communication path.

The general coverage signals are transmitted using an antenna having an angle of view that is the same as the overall coverage angle of the base station. This antenna is referred to as the "sector" antenna. Optionally, the base station can communicate a directed transmission to a particular subscriber station via the sector antenna if there is doubt as to the validity of the last best communication path information. This may occur if a long period of time has elapsed since a previous determination of the best communication path, or if there is an indication that the subscriber station is moving between areas covered by different ones of the antenna beams.

The choice of transmit antenna is coupled to the choice of downlink physical layer data rate. When the base station determines a need to utilize the sector antenna for a directed transmission, it reduces the data rate based on the relative gain of the beam formed and the sector antenna.

IEEE 802.16 includes the different physical layers OFDM, OFDMA, and DSS-SC (orthogonal frequency division multiplexing; orthogonal frequency division multiplexing access). Of these, the OFDM physical layer is supported in the bands between two (2) and six (6) GHz. The WiMAX forum is directed to the OFDM physical layer, also referred to as WirelessMAN-OFDM, and its unlicensed band minor variation referred to as WirelessHUMAN(-OFDM). Time domain duplexing (TDD) is an available option in the bands.

IEEE 802.16 is designed to provide for quality of service (QoS) which makes both the protocol and the hardware more complex. An 802.16 base station exercises control over many aspects of the behavior of each of the subscriber stations connected to it. Both the MAC (medium access control) and the physical layer include peer-to-peer protocol signaling. The MAC definition is common to all of the physical layers, but is not independent of the physical layer, and the MAC is aware of the physical layer in use and operates accordingly.

FIG. 1 illustrates a WirelessMAN-OFDM physical layer frame structure 100 that includes any number of frames (N to N+2). Frame (N) includes both downlink (DL) and uplink (UL) transmissions. The downlink transmissions include a preamble, a frame control header (FCH), and any number of downlink bursts (1–N). The uplink transmissions include a contention slot one (1), a contention slot two (2), and any number of uplink bursts (1–N).

IEEE 802.16 is a "scheduled access" system. The transmissions between a base station and subscriber stations occur at regular intervals, and each of these intervals is a frame. All of the subscriber stations connected to a given base station must adhere to the frame timing of the base station. The multiple beam antenna base station makes use of this known timing feature of 802.16 to achieve superior performance.

The downlink preamble is used to time-synchronize all of the subscriber stations to a base station. The frame structure, including the number and size of downlink and uplink bursts, is variable from frame to frame and is signaled by the base station to all of the subscriber stations in the downlink frame control header (FCH). The downlink preamble and the frame control header (FCH) transmit in every frame simultaneously over an entire coverage area of the base station. The uplink contention slots (1-2) are used for initial access and are therefore observed in every frame simultaneously over the entire coverage area of the base station.

Figure 2:
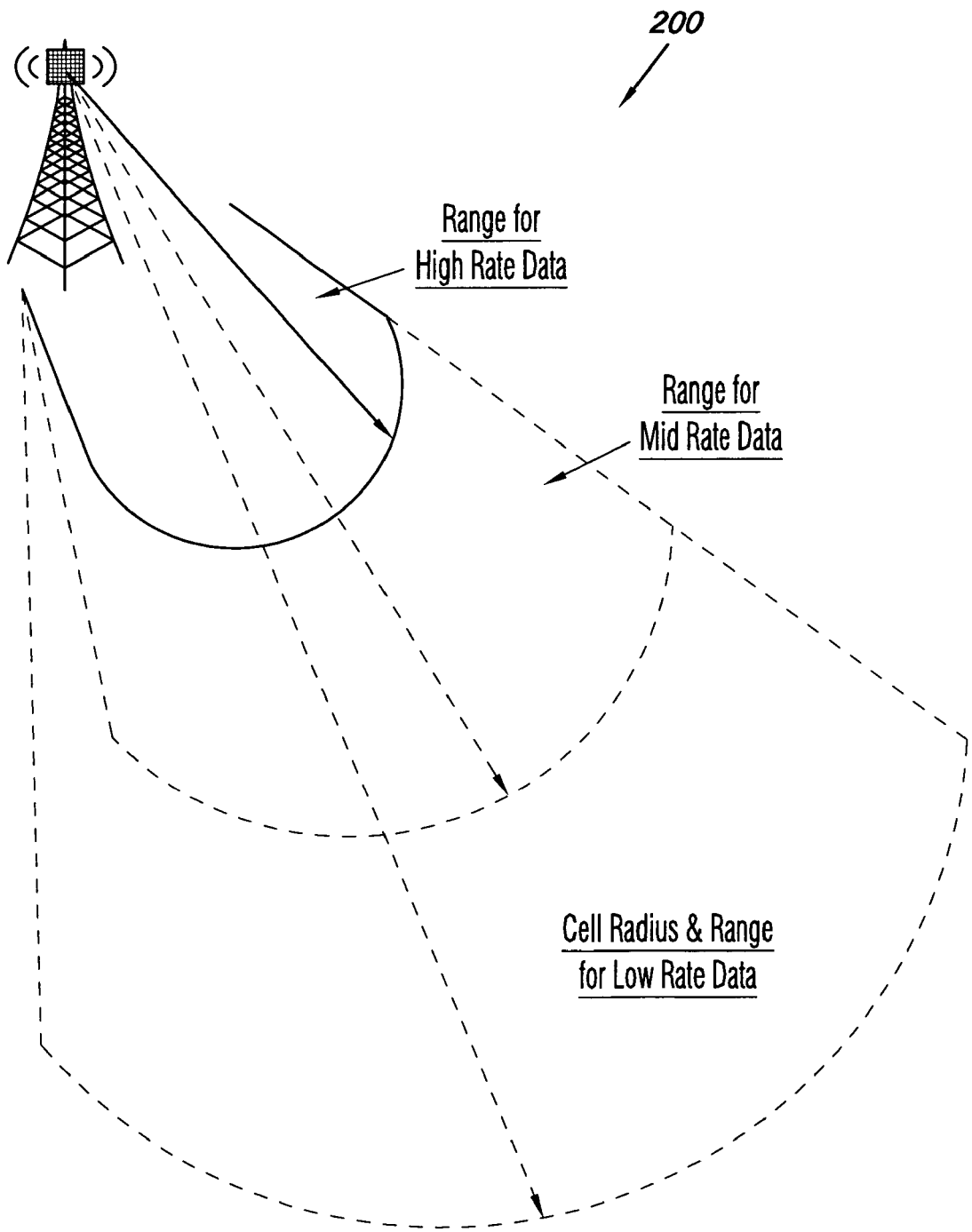
FIG. 2 illustrates various data rate ranges for a conventional WiMAX base station.

FIG. 2 illustrates various data rate ranges 200 for a conventional WiMAX base station. As illustrated, a data rate range decreases for higher data rates. For example, the range for high rate data is less than the range for mid rate data which, in turn, is less than cellular radius and the range for low rate data.

Figure 3:
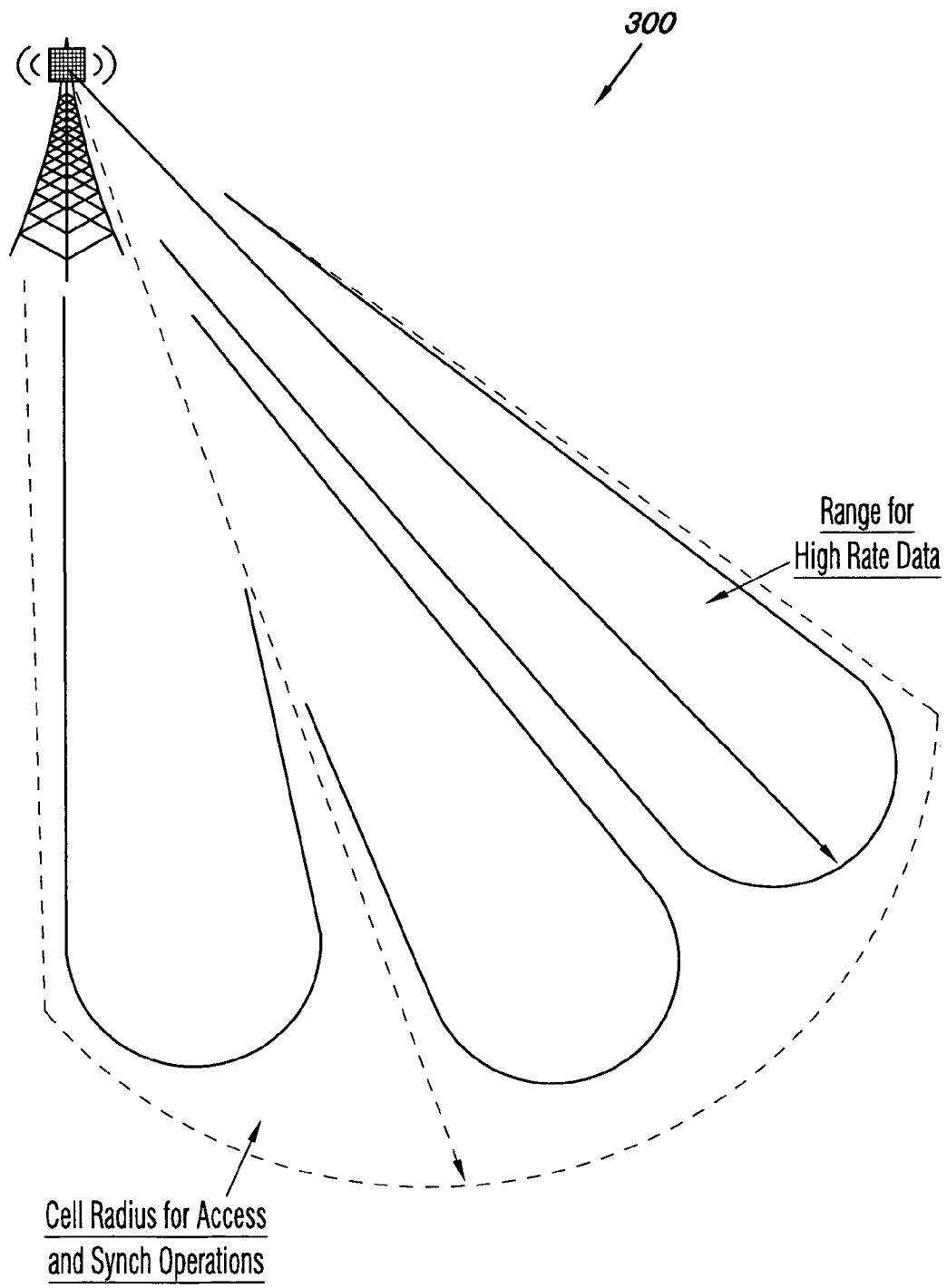
FIG. 3 illustrates a data rate range in an embodiment of multiple beam antenna base station.

FIG. 3 illustrates a data rate range 300 in an embodiment of multiple beam antenna base station. As illustrated, the range for high rate data is maintained throughout the cellular radius with the beam formed antenna and slot-steering. The multiple beam antenna base station operates with standard WiMAX subscriber stations and provides interference mitigation to achieve superior quality of service (QoS) in unlicensed band operation. The cell Radius is set by a sector antenna.

Figure 4:
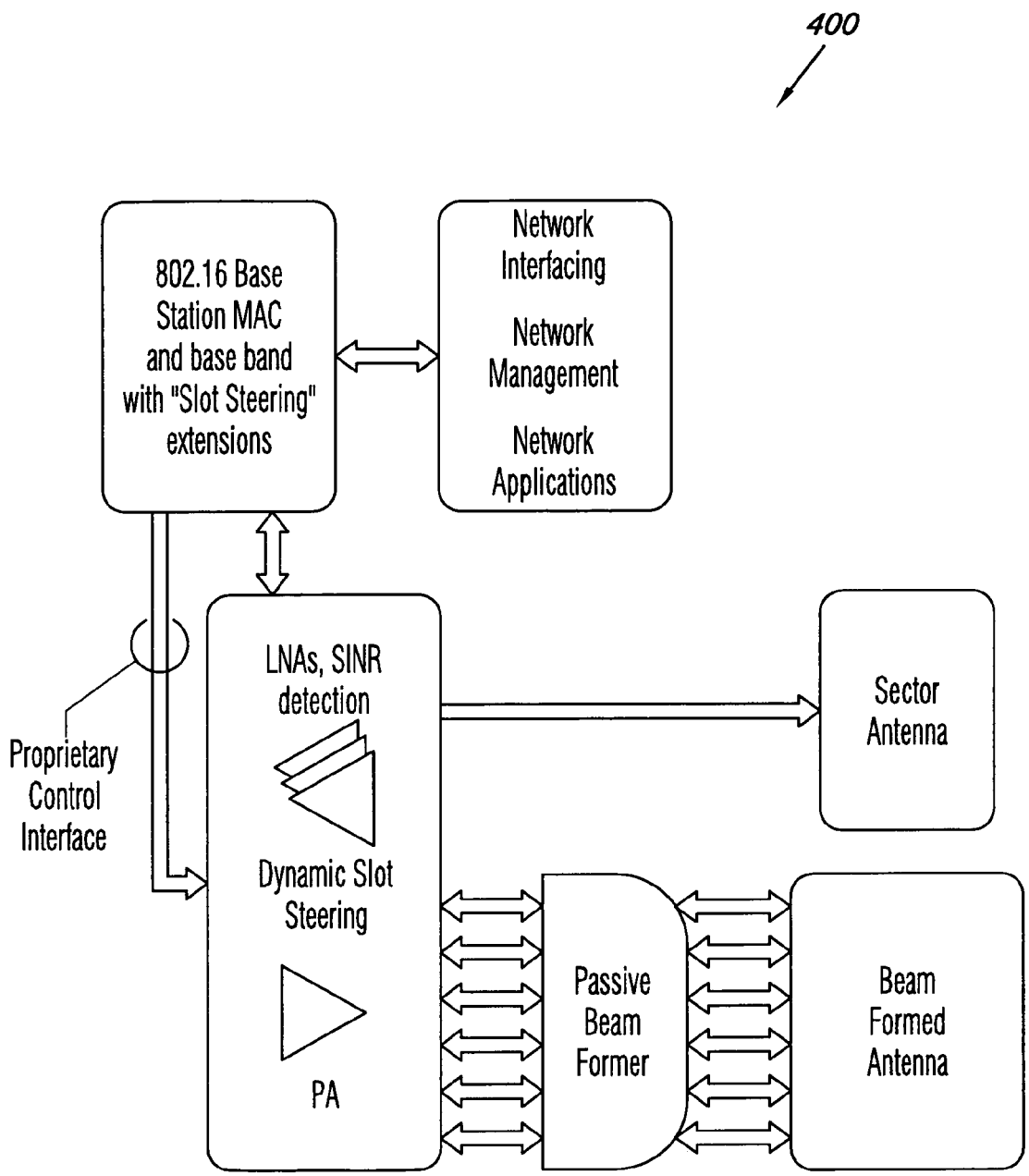
FIG. 4 illustrates an architecture embodiment of a multiple beam antenna base station.

FIG. 4 illustrates an architecture 400 of an exemplary multiple beam antenna base station. The architecture includes a network interfacing, management, and applications component(s) that are coupled for data communication with an 802.16 base station MAC which includes base band with slot steering extensions. The 802.16 base station MAC is coupled for data communication with a Dynamic Slot Steering™ component that includes LNAs (low noise amplifiers and/or preamplifiers), SINR (signal to interference and noise ratio) detection, and power amplifier(s).

The Dynamic Slot Steering™ component is coupled for data communication to a sector antenna, and with a passive beam former via multiple transmission and receiving data links. The passive beam former is further coupled for data communication with beam formed phased array antenna via multiple transmission and receiving data links.

Transmission synchronization (TX Sync) and broadcast operations, which are low data rate transmissions as required by the standards, are accomplished via the sector antenna. Transmission unicast operations are steered though the appropriate beam of the beam formed phased array antenna to the targeted subscriber station at high data rate. The receiver (RX) monitors all of the beams and utilizes the best communication signal for reception and to set a transmission direction.

Figure 5:
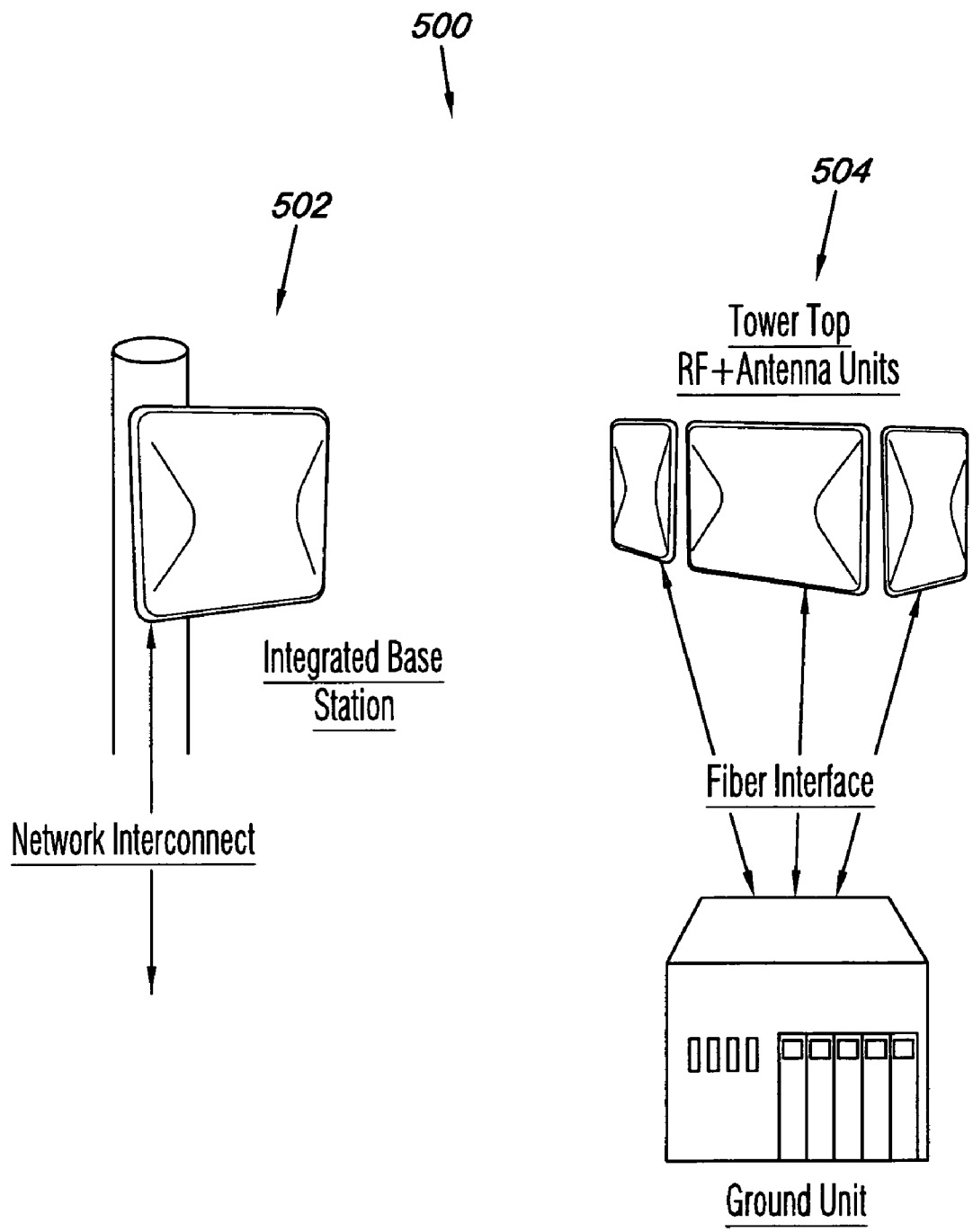
FIG. 5 illustrates a system embodiment for WiMAX multiple beam antenna base stations according to the present disclosure.

FIG. 5 illustrates an exemplary system 500 of WiMAX multiple beam antenna base stations. The system includes an integrated base station 502 and a carrier class base station 504. The integrated base station 502 includes a multiple beam antenna base station (also referred to as a "Smart Antenna Base Station") per unit. Multiple integrated base stations can be collocated for 360 degree coverage or for redundancy.

The carrier class base station 504 includes tower top RF+Antenna units which include RF/IF/ADC modules and diplexer(s) if FDD. The tower top RF+Antenna units are coupled for data communication with a ground unit via fiber interface for dedicated inter-unit control. The ground unit includes at least a base station control processor, network interface module(s), base band module(s) one per sector, and/or power conditioning components.

The multiple beam antenna base station (e.g., "smart antenna" base station) can determine the direction to a subscriber station to utilize and take advantage of beam forming. Without advanced antenna system (AAS) support on both ends, which is not part of the WiMAX definition, the OFDM (orthogonal frequency division multiplexing) air interface requires that the downlink (DL) preamble and frame control header (FCH) be identical in all directions covered by a base station; therefore it does not provide means for a subscriber station to determine which beam it can receive the best other than to make each beam a separate base station on its own channel.

Thus, the multiple beam antenna base station (e.g., "smart antenna" base station) makes a direction determination on its own utilizing the beam-formed antennae to listen to (e.g., "detect") the signal from the subscriber stations. Unless the system is restricted to fixed, long term connections, scanning may not be practical if the uplink (UL) preambles are too short in which case some uplink transmissions will be missed. If this restriction is accepted, then the base station can scan to learn the direction to each subscriber stations over some small amount of time.

As such, all of the beams are monitored simultaneously and each beam has at least a partial receiver of its own capable of SINR (signal to interference and noise ratio) determination on the preambles. The base station then selects the receiving (RX) path that produces the best SINR and passes this signal to the remainder of the receive path and to the MAC (medium access controller). An advanced base station can be implemented to use a number of techniques, such as MMSE (minimum mean-squares error), for combining two or more beams for receiving that produce a usable signal. However, a single transmission (TX) direction must still be decided.

In each frame, the Dynamic Slot Steering™ component determines the optimum beam with which to receive a signal from a subscriber station, uses that optimum beam to receive the signal, and then uses that optimum beam to transmit directed signals to the subscriber station at higher data rates than would be possible with a conventional base station. While sector reception can be accomplished by evaluating, or looking, at all of the beams simultaneously with multiple receivers, sector transmission (TX) utilizes the actual sector antenna. Providing data for communication on all of the beams simultaneously would result in a deeply irregular radiation pattern.

Figure 6:
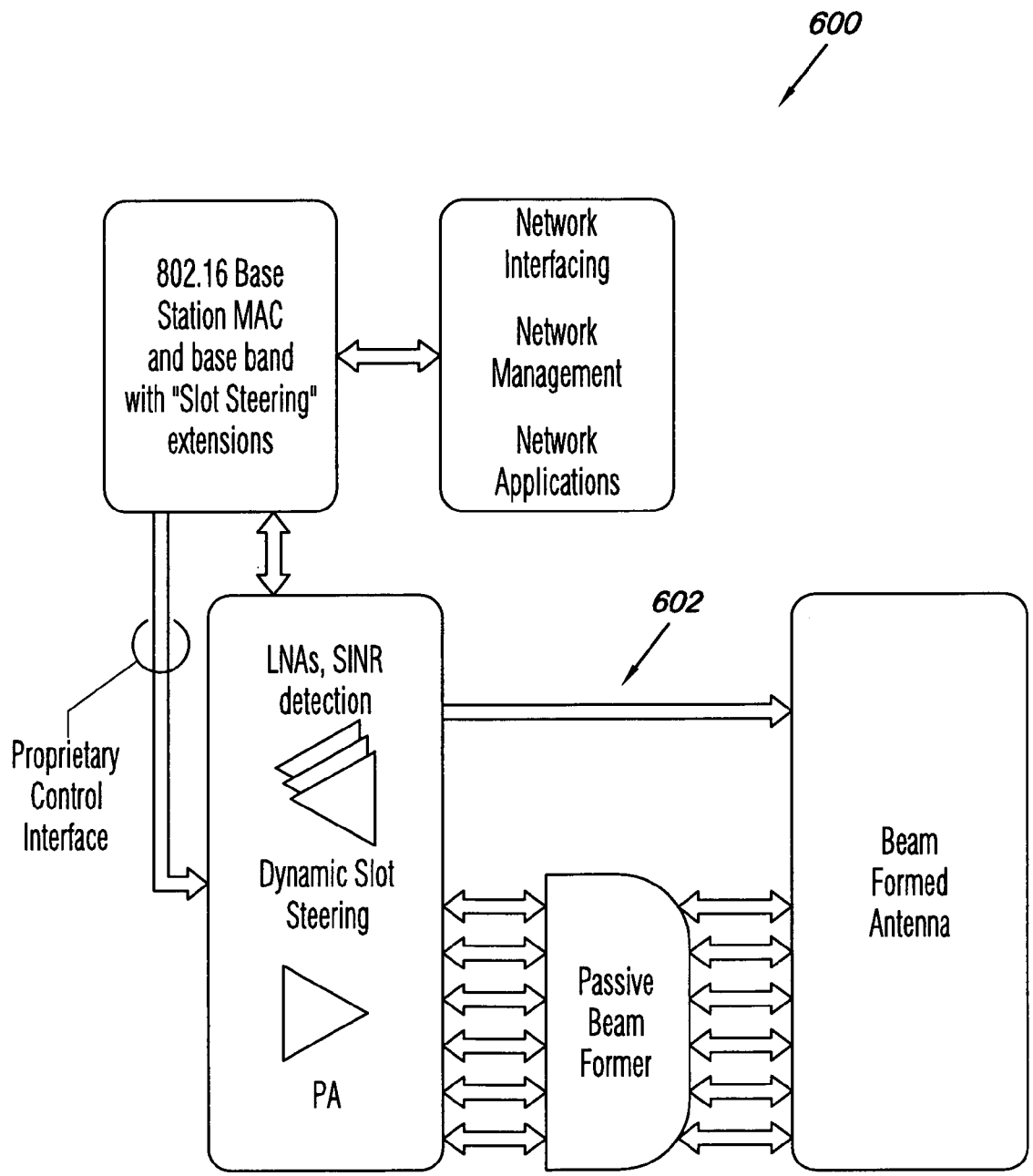
FIG. 6 illustrates another architecture embodiment of a multiple beam antenna base station.

FIG. 6 illustrates an architecture 600 of an exemplary multiple beam antenna base station. The architecture 600 is similar to the architecture described with reference to FIG. 4, except that the sector antenna does not necessarily have to be a physically separate antenna, but rather could be a direct feed 602 to only one of the columns of the phased array (e.g., beam formed antenna).

Figure 7:
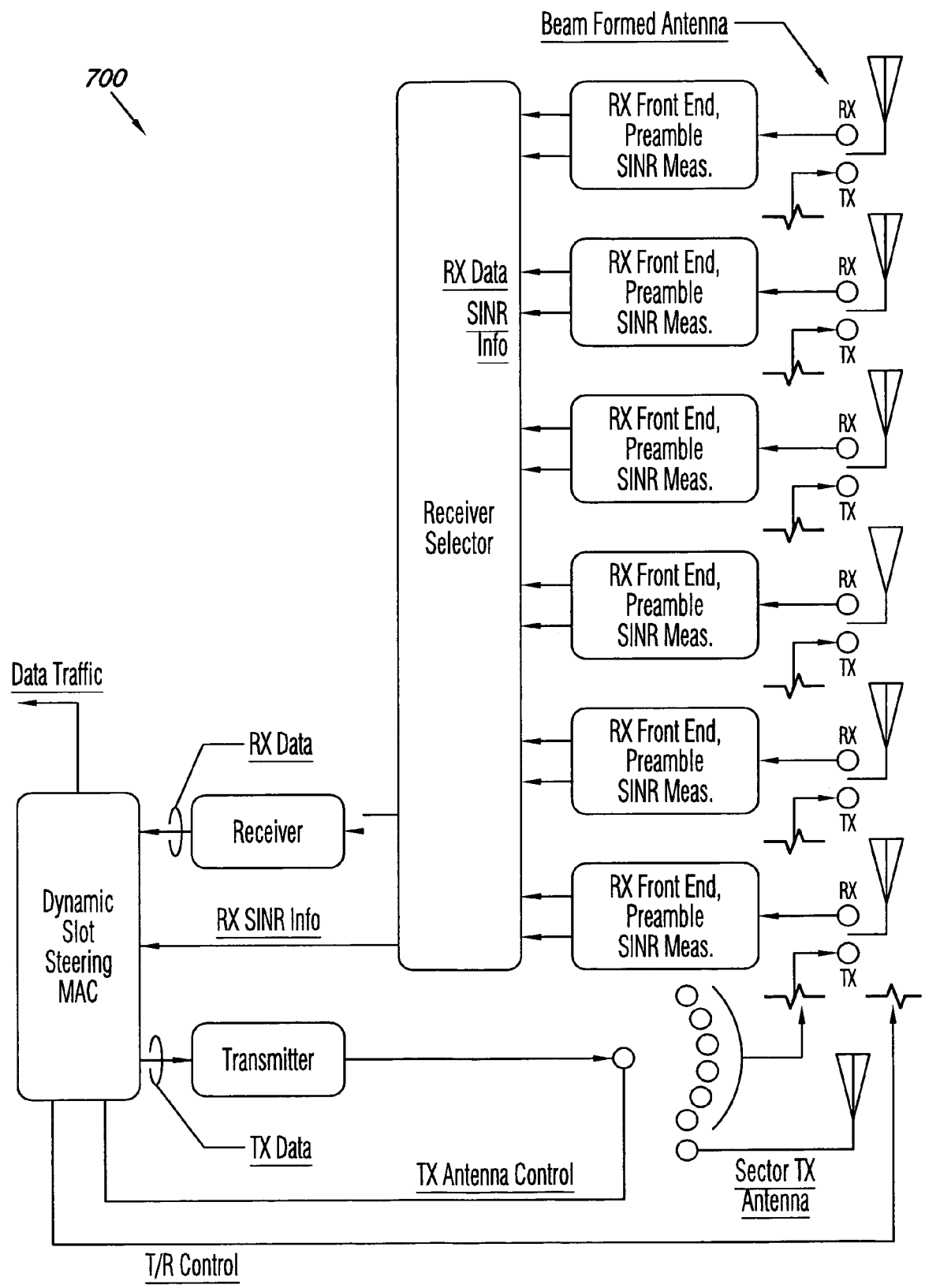
FIG. 7 illustrates a block diagram embodiment of a multiple beam antenna base station.

FIG. 7 illustrates an exemplary block diagram 700 of a multiple beam antenna base station. The diagram includes Dynamic Slot Steering™ component, a receiver for receiving (RX) data, a transmitter for transmission (TX) data, and a receiver (RX) selector. The transmitter receives the transmission data from the Dynamic Slot Steering™ component and communicates the transmission data to the sector antenna and/or to any one or more of the beam-formed antennas. The receiver selector receives front end, preamble, and SINR measurements (e.g., receiving (RX) data and SINR information) from any one or more of the beam-formed antennas and communicates the receiving data and/or SINR information to the receiver. The receiver then communicates the receiving data to the Dynamic Slot Steering™ component.

Methods for multiple beam antenna base station, such as exemplary method 800 described with reference to FIG. 8, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 8:
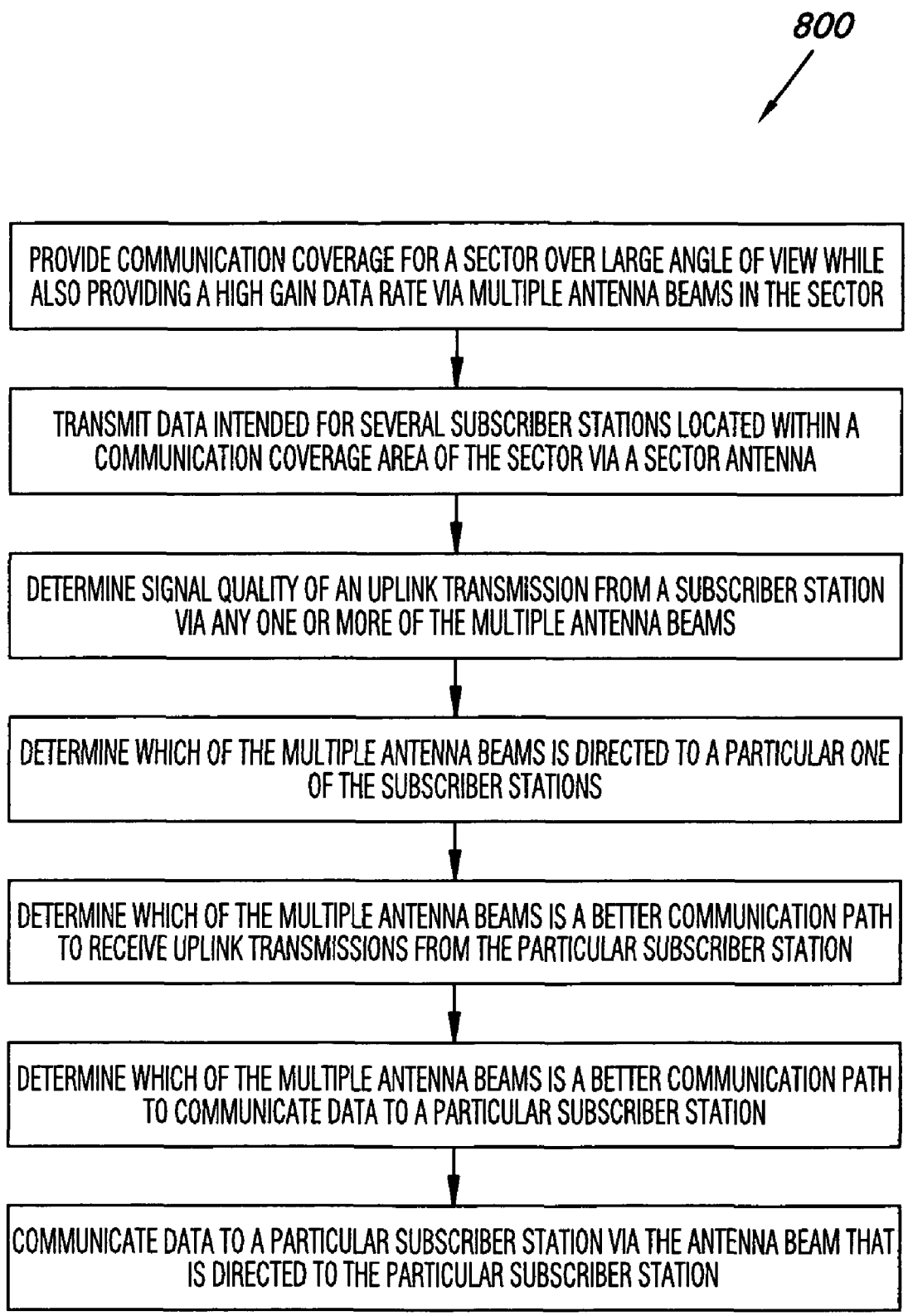
FIG. 8 illustrates a method embodiment for multiple beam antenna base stations according to the present disclosure.

FIG. 8 illustrates an exemplary method 800 for multiple beam antenna base station. The order in which the method is described is not intended to be construed as a limitation, and any number of the described method blocks can be combined in any order to implement the method, or an alternate method. Furthermore, the method can be implemented in any suitable hardware, software, firmware, or combination thereof.

Communication coverage is provided for a sector over a large angle of view while also providing a high gain data rate via multiple antenna beams in the sector.

Data intended for several subscriber stations located within a communication coverage area of the sector is transmitted via a sector antenna.

Data intended for several subscriber stations located within a communication coverage area of a single beam is transmitted via the appropriate beam of the beam formed antenna Signal quality of an uplink transmission from a subscriber station via any one or more of the multiple antenna beams is determined.

A determination is made as to which of the multiple antenna beams is directed to a particular one of the subscriber stations.

A determination is made as to which of the multiple antenna beams is a better communication path to receive uplink transmissions from the particular subscriber station.

A determination is made as to which of the one or more multiple antenna beams is a better communication path to communicate data to a particular subscriber station.

Data is communicated to the particular subscriber station via the antenna beam that is directed to the particular subscriber station.

Although embodiments of multiple beam antenna base station have been described in language specific to structural features and/or methods, it is to be understood that the subject of the appended claims is not necessarily limited to the specific features or methods described. Rather, the specific features and methods are disclosed as exemplary implementations of multiple beam antenna base station.

The invention claimed is:

1. One or more non-transitory computer storage media comprising computer executable instructions that, when executed, direct a computer-based multiple beam antenna base station to:

associate each of a number of multiple antenna beams with an independent base station, resident receiver for each of said beams;
simultaneously monitor each of the number of multiple antenna beams;
determine signal quality of a preamble of an uplink transmission from the number of subscriber stations via the number of multiple antenna beams;
issue a signal quality report from each of the resident receivers to determine which of the number of multiple antenna beams is directed to a particular one of a number of subscriber stations to the multiple beam antenna base station; and
communicate data to the particular subscriber station via the antenna beam that is directed to the particular subscriber station;
wherein: the base station comprises a plurality of beam formed antennas, at least one of the beam formed antennas acting as a sector antenna;
downlink preamble, frame control header bursts, and broadcast messages are sent by the sector antenna in all directions covered by the base station and messages intended for the particular subscriber stations are sent by a corresponding beam formed antenna only in a direction corresponding to that particular subscriber station;
when a particular amount of time has elapsed since the best communication path was last determined, the multiple beam antenna base station determines a need to utilize the sector antenna for a directed transmission, the multiple beam antenna base station reduces a data rate based on a relative gain of a beam formed and the sector antenna.

2. The one or more computer storage media as recited in claim 1, wherein the computer executable instructions include instructions that, when executed, direct the computer-based multiple beam antenna base station to:

determine signal quality of a preamble of an uplink transmission from the number of subscriber stations via the number of multiple antenna beams; and
issue a signal quality report used to select one of the number of multiple antenna beams as a better communication path to receive a remainder of the uplink transmission from a particular subscriber station.

3. A time division duplexed communication system comprising one or more non-transitory computer storage media comprising computer executable instructions that, when executed, direct a computer-based multiple beam antenna base station to:

associate each of a number of multiple antenna beams with an independent base station, resident receiver for each of said beams;
simultaneously monitor each of the number of multiple antenna beams;
determine signal quality of a preamble of an uplink transmission from the number of subscriber stations via the number of multiple antenna beams;
issue a signal quality report from each of the resident receivers to determine which of the number of multiple antenna beams is directed to a particular one of a number of subscriber stations to the multiple beam antenna base station; and
communicate data to the particular subscriber station via the antenna beam that is directed to the particular subscriber station;
wherein: the base station comprises a plurality of beam formed antennas, at least one of the beam formed antennas acting as a sector antenna;

downlink preamble, frame control header bursts, and broadcast messages are sent by the sector antenna in all directions covered by the base station and messages intended for the particular subscriber stations are sent by a corresponding beam formed antenna in a direction only corresponding to that particular subscriber station;

when a particular amount of time has elapsed since the best communication path was last determined, the multiple beam antenna base station determines a need to utilize the sector antenna for a directed transmission, the multiple beam antenna base station reduces a data rate based on a relative gain of a beam formed and the sector antenna.

* * * * *